United States Patent [19]
Ishigame et al.

[11] Patent Number: 5,338,710
[45] Date of Patent: Aug. 16, 1994

[54] CERAMIC SUBSTRATE SINTERED AT LOW TEMPERATURES

[75] Inventors: Juji Ishigame, Hamura; Yoshiaki Matsumura, Oume, both of Japan

[73] Assignee: Sumitomo Metal Mining Company, Limited, Tokyo, Japan

[21] Appl. No.: 134,899

[22] Filed: Oct. 13, 1993

[30] Foreign Application Priority Data

Dec. 9, 1992 [JP] Japan .................................. 4-351545

[51] Int. Cl.$^5$ .......................... C03C 1/00; C03C 14/00
[52] U.S. Cl. .......................................... 501/32; 501/8; 501/17; 501/21; 156/89
[58] Field of Search .................. 501/32, 8, 17, 21; 156/89

[56] References Cited

U.S. PATENT DOCUMENTS 4,749,665  6/1988  Yamo et al. ............................ 501/32
4,853,349  8/1989  Martin ..................................... 501/8

*Primary Examiner*—Mark L. Bell
*Assistant Examiner*—Deborah Jones
*Attorney, Agent, or Firm*—Watson, Cole, Grindle & Watson

[57] ABSTRACT

A ceramic substrate sintered at low temperature comprising: 20 to 50% by volume of an anorthite ($CaAl_2Si_2O_8$) crystal phase, 1 to 20% by volume of a gahnite ($ZnAl_2O_4$) crystal phase and the balance of a glass phase and, further, containing 35 to 50% by weight of alumina ($Al_2O_3$) as a filler. Since the substrate can be sintered at a temperature lower than 900° C., has a mechanical strength as large as more than 2500 kgf/cm$^2$ and a thermal expansion coefficient of less than $60 \times 10^{-7}$/°C., Au Ag and Cu can be used as a conductor and the substrate can be used like that existent alumina substrate.

8 Claims, No Drawings

CERAMIC SUBSTRATE SINTERED AT LOW TEMPERATURES

BACKGROUND OF THE INVENTION

1. Field of the Invention

The present invention concerns ceramic substrates which are sintered at low temperatures and are used as circuit substrates in electronic devices.

2. Description of the Prior Art

Alumina substrates generally in use in electronic elements are sintered at high temperatures, e.g., 1500° to 1600° C. However, low temperature sintering has recently been developed for ceramic substrates used to mount electronic parts. Further, for attaining a multi-layered alumina circuit substrate, a conductor interposed between layers is limited to a high melting point material having relatively high resistivity such as tungsten or molybdenum. As such, a reducing atmosphere Is necessary when sintering for preventing the material from oxidizing. As a result, the resistance of the wirings is increased, resulting in restrictions in the wiring pattern when transmission loss of electric signals is taken into consideration. That is, a great amount of energy has to be consumed, in the case of using alumina, when the substrate is sintered for forming a multi-layered conductor circuit, and this remarkably increases the production cost and also imposes a large restriction in characteristics. In order to overcome such a drawback, it has become necessary to develop ceramic materials which are sinterable at a temperature of 800° to 1000° C., preferably 850° to 900° C., and to develop a multi-layered structure therefor. Lowering of the sintering temperature is advantageous in enabling the use of conductors of low resistance value such as Au, Ag—Pd, Ag and Cu, which are low temperature sinterable materials.

However, although known substrates sintered at low temperature are sinterable at 800° C. to 1000° C., their mechanical strength is considerably reduced as compared with a strength of 3000 to 4000 kgf/cm$^2$ of alumina substrates.

For instance, Japanese Patent Publication HEI 3-53269 discloses a substrate having a mechanical strength of about 2,000 kgf/cm$^2$ obtained by adding an Al$_2$O$_3$ powder to CaO—SiO$_2$—Al$_2$O$_3$ system glass, sintering the mixture at 800° C. to 1,000° C., and depositing anorthite crystals. However, its mechanical strength is inferior to that of an alumina substrate.

Further, Japanese Patent Laid-Open Hei 3-33026 discloses a composition sinterable at 850° C. obtained from a combination of crystallized glass in which ZnO and alkaline earth metal oxides contribute to crystallization and a ceramic filler, but it mentions nothing about the strength.

SUMMARY OF THE INVENTION

An object of the present invention is to provide an improved ceramic substrate which is sintered at a substrate temperature of lower than 900° C., which has a mechanical strength greater than 2,500 kgf/cm$^2$ and a thermal expansion coefficient of less than $60 \times 10^{-7}$/°C., which enables the use of Au, Ag and Cu as conductors, and which is comparable with an alumina substrate in use.

The foregoing object of the present invention can be attained with a ceramic substrate sintered at low temperature, comprising 50 to 65% by weight of a mixture of 20 to 50% by volume of an anorthite (CaAl$_2$Si$_2$O$_8$) crystal phase, 1 to 20% by volume of a gahnite (ZnAl$_2$O$_4$) crystal phase, and a balance of a glass phase, and 35 to 50% by weight of alumina (Al$_2$O$_3$) as a filler.

When the present invention is put into practice, the anorthite crystal phase is used in an amount of 20 to 50% by volume, preferably 35 to 50% by volume. If it is less than 20% by volume, the mechanical strength of the substrate is poor and the dielectric constant cannot be reduced. On the other hand, if it exceeds 50% by volume, since the relative amount of the filler is reduced, the strength again becomes poor. Further, the gahnite crystal phase is used an amount of 1 to 20% by volume, preferably 3 to 15% by volume. If it is less than 1% by volume, its effect of increasing the strength in cooperation with anorthite cannot be obtained. On the other hand, if it exceeds 20% by volume, segregation occurs in the glass phase and densification of the substrate is hindered.

It is necessary that the residue comprises the glass phase. Alumina (Al$_2$O$_3$) has to be used as the filler and it should be included in an amount of 35 to 50% by weight of the ceramic substrate sintered at low temperature. If it is less than 35% by weight or more than 50% by weight, the mechanical strength of the substrate becomes insufficient. Further, it is important that the alumina content be within the above-mentioned range, this can form 20 to 50% by volume of the anorthite crystal phase and 1 to 20% by volume of the gahnite crystal phase respectively, and the crystallization ratio required therefor is 40 to 60% by weight.

For producing the ceramic substrate sintered at low temperature according to the present invention, the anorthite crystal phase (CaO.Al$_2$O$_3$.2SiO$_2$), the gahnite crystal phase (ZnAl$_2$O$_4$) and the Al$_2$O$_3$ filler have to formed and present in the glass phase. For this purpose, it is necessary to provide a suitable glass frit, and oxides of namely CaO, Al$_2$O$_3$, SiO$_2$ and ZnO as the raw materials for the composition or anorthite and gahnite, each in a multiple of the stoichiometrical amount thereof so as to be within the range of the above specified percent by volume are employed, as well as other glass ingredients including a flux. As the flux, PbO, ZnO, B$_2$O$_3$, Sb$_2$O$_3$ and other alkali oxides can be selected, PbO being particularly suitable. A suitable range of the composition for each of the raw material oxides (wt %) desirable to obtain a glass phase containing the anorthite, gahnite and the flux suitable to the ceramic substrate sintered at low temperature according to the present invention is CaO: 5–20, Al$_2$O$_3$: 10–20, SiO$_2$: 30–45, MgO: 0–10, ZnO: 2.5–20, PbO: 10–25, B$_2$O$_3$: 0–5, Li$_2$O: 0–2, Sb$_2$O$_3$: 0.1–1.

Further, each of the oxides has the following functions.

CaO is an ingredient for anorthite. If it is less than 5% by weight, the deposition amount of anorthite is small, which lowers the mechanical strength of the ceramic substrate sintered at low temperature. On the other hand, if in exceeds 20% by weight, the thermal expansion coefficient of the ceramic substrate sintered low temperature is increased.

Al$_2$O$_3$ is an ingredient of anorthite and gahnite. If it is less than 10% by weight, the deposition amount of anorthite and gahnite is small, preventing attainment of sufficient mechanical strength for the ceramic substrate sintered at low temperature. On the other hand, if it exceeds 20% by weight, the glass softening temperature increases and sintering at a temperature lower than 1000° C. is no longer possible.

SiO$_2$ is an ingredient of anorthite, as well as a glass-forming ingredient. If it is less than 30% by weight, the deposition amount of anorthite and gahnite is small. On the other hand, if it exceeds 45% by weight, the glass softening point is increased, which elevates the sintering temperature.

ZnO is an ingredient of gahnite. If it is less than 2.5% by weight, the deposition amount of gahnite is small. On the other hand, if it exceeds 20% by weight, it causes segregation in glass.

Both MgO and PbO function to lower the glass softening point or melting point. If MgO is added in excess of 10% by weight, the softening point increases excessively. If PbO is added in an amount of less than 10% by weight, the softening point is too high to lower the sintering temperature, as well as the deposition amount of anorthite is decreased. On the other hand, if it exceeds 25% by weight, the thermal expansion coefficient of the ceramic substrate sintered at low temperature is increased.

B$_2$O$_3$ lowers the glass softening point and also lowers the glass melting temperature. If it is added in excess of 5% by weight, the deposition amount of anorthite is reduced upon crystallization.

Li$_2$O lowers the glass softening point and melting point, but if it is added in excess of 2% by weight, the thermal expansion coefficient of the ceramic substrate at low temperature is increased.

Further, Sb$_2$O$_3$ lowers the melting point, but if it is added in excess of 1% by weight, it also increases the thermal expansion coefficient of the ceramic substrate sintered at low temperature.

The glass frit can be obtained by a general production process of mixing the above-mentioned oxides, melting them at 1300°–1600° C., subsequently gradually cooling, and finely pulverizing.

A ceramic filler such as zircon (ZiSiO$_4$), cordierite (2MgO.2Al$_2$O$_3$.5SiO$_2$), mullite (3Al$_2$O$_3$.2SiO$_2$) or the like may be added to the glass frit and sintered for improving the strength of the ceramic substrate sintered at low temperature.

For obtaining the ceramic substrate sintered at low temperature according to the present invention, the glass frit is mixed with Al$_2$O$_3$ as a filler and an organic binder and molded into a layer using a doctor blade or the like, and several layers are laminated under pressure into a green sheet and then sintered in air at a temperature lower than 1000° C., preferably 800° to 900° C. Al$_2$O$_3$ as the filler is used, preferably in an amount of 35 to 50% by weight, with its grain size being preferably from 0.5 to 0.8 $\mu$m.

The ceramic substrate sintered at low temperature according to the present invention can be obtained at a temperature of lower than 1000° C. as described above. As a characteristic feature, the glass frit is softened to fluidize into a viscous form at about 800° C. in which fine Al$_2$O$_3$ particles wet. As the temperature increases further to about 900° C., anorthite starts to deposit as a crystal phase around the Al$_2$O$_3$ particles and then the gahnite crystal phase deposits so as to fill the gaps among each anorthite crystal phase. According to observation by SEM (scanning electron microscope), it can be seen than anorthite is present as rectangular crystals and gahnite is present in the form of fine particles of about 0.1 to 3 $\mu$m. After the sintering temperature reaches 900° C., they may be kept at that temperature for several ten minute intervals and then cooled to room temperature. Abrupt cooling should be avoided because this causes cracks in the ceramic substrates sintered at low temperature.

In order to determine the volume percentage of the anorthite and gahnite crystal phases in the ceramic substrate sintered at low temperature, the analytical method by powder X-ray diffractometry is most suitable. For this purpose, it is necessary to previously determine crystallinity showing the degree of change of glass into crystals before and after the sintering of the substrate. For instance, amorphous peaks before and after sintering may be determined for the substrate and the crystallinity may be determined by powder X-ray diffractometry due to the reduction of the peak intensity as shown in the Journal of The American Ceramic Society, Vol. 45, p. 170 (1962).

It is necessary to determine the volume of the crystal phase in the substrate based on the thus determined crystallinity.

Next, for determining the volume percentage, assuming the volume percentage of anorthite and gahnite and alumina in the substrate as Can, Cga, Cal, the diffraction line intensity Ian, Iga and Ial for each of the phases can be shown by the following equations:

$$Ian = k \times Ran \times Can/2 \; \mu m \tag{1}$$

$$Iga = k \times Ran \times Cgn/2 \; \mu m \tag{2}$$

$$Ial = k \times Ral \times Cal/2 \; \mu m \tag{3}$$

where k represents a constant determined by incident beam or the like, $\mu$m represents a linear absorption coefficient of a specimen, Ran, Rga and Ral are constants determined by crystal structure or diffraction angle, which are represented by the following equation (4):

$$R = P \times |F(hkl)|^2 \times L(\theta) \times T/Vu^2 \tag{4}$$

where P1 P: multiplicity factor
F (hkl): structure factor
L($\theta$): Lorentz factor
T: temperature factor
Vu: volume of unit cell The ratios between the equations (1) and (2) and between the equations (1) and (3) are shown below.

$$Can/Cga = (Rga/Ran) \times (Ian/Iga) \tag{5}$$

$$Can/Cal = (Rga/Ral) \times (Ian/Ial) \tag{6}$$

Accordingly, Can/Cga and Can/Cal can be determined by measuring Ian, Iga and Ial and thus the volume percentage for each crystal phase in the substrate can be determined.

EXAMPLE

As shown in Table 1, oxides (carbonate compounds such as CaCO$_3$, K$_2$CO$_3$, Na$_2$CO$_3$, Li$_2$CO$_3$ show high purity for CaO, K$_2$O, Na$_2$O, Li$_2$O) for each of the compositions were accurately weighed in a digital balance, and starting materials to be mixed were crushed and mixed in a auto motor for 1 to 2 hours. The completely mixed powder was placed in a platinum crucible and melted at a temperature of 1300° to 1550° C. for 1 to 2 hours in an electric furnace. In the melting operation, the molten glass was stirred by a platinum paddle several times to improve the homogeneity of the glass. After the glass was sufficiently clarified, the glass was cast on a stainless plate or carbon plate, charged while it still had a red grow into an electric furnace maintained at 700°–800° C., and subjected to gradual cooling. The glass free from striae and foams was cut out and used for the measurement of thermal expansion coefficient, glass transition point and dilatometric softening point.

Table 2 shows the melting temperature, the thermal expansion coefficient, the glass transition point and the dilatometric softening point of each glass.

Then, the glass cooled to a room temperature was coarsely pulverized by a roll crusher. Subsequently, the coarse pulverizates were finely pulverized in a ball mill of excellent abrasion resistance at a rotational number of 100 rpm for about three days in a wet process by adding an appropriate amount of an organic solvent such as ethanol or isopropanol. The slurrifled liquid suspension was transferred to a container and the organic solvent was evaporated in a drying furnace at a temperature of 60° to 120° C. to obtain a dry glass frit.

The glass frit was mixed with a binder and molded into a green sheet of about 100 μm by a doctor blade method and several sheets were laminated and press bonded under heating. The green sheet was sintered, being kept at a highest temperature of 850° to 900° C. for 20 minutes, and crystallized. The glass systems showed a behavior of uniformly depositing crystal particles from the glass surface during retention at the highest temperature. Crystallization was completed within 10 to 20 minutes. Crystallization did not greatly depend on the temperature elevation rate. Using the samples, the crystal phase was identified based on the thermal expansion coefficient after sintering and crystallization at 900° C. and X-ray diffractometry (Table 3).

Further, the sintered specimen (specimen No. 16 in Table 2) was polished to become mirror surfaced, was chemically etched, and when the crystal grains were observed by SEM, a fine structure having uniform and dense rectangular crystallite of about 5 μm in long diameter and about 1 μm in short diameter was confirmed. As shown in Tables 2 and 3, it can be seen that glass can flow and crystallize under the heat treatment conditions at 850°–900° C. only when the glass melting point is lower than 1400° C.

Then, as shown in Table 4, a powder mixture formed by adding 20 to 60 wt % of alumina powders to each kinds of selected glass frits successively were prepared. Such samples were molded into predetermined sizes and then sintered at 900° C., and the result of a bending strength test for them are shown in Table 4. In the examples of the present invention, the strength is 2450 to 3510 $kgf/cm^2$ and a mechanical strength comparable with that of an alumina substrate was attained, the heat expansion coefficient was less than $60 \times 10^{-7}/°C.$, and the dielectric constant was reduced as compared with that of alumina.

TABLE 1

| Specimen No. | CaO | $Al_2O_3$ | $SiO_2$ | MgO | ZnO | PbO | $B_2O_3$ | $K_2O$ | $Na_2O$ | $Li_2O$ | $Sb_2O_3$ |
|---|---|---|---|---|---|---|---|---|---|---|---|
| 1 | 23.3 | 14.6 | 62.1 | — | — | — | — | — | — | — | — |
| 2 | 13.3 | 14.6 | 62.1 | 5.0 | 5.0 | — | — | — | — | — | — |
| 3 | 23.3 | 14.6 | 52.1 | — | — | — | 10.0 | — | — | — | — |
| 4 | 13.3 | 14.6 | 61.1 | 5.0 | 5.0 | — | — | — | — | 1.0 | — |
| 5 | 13.3 | 14.6 | 58.6 | 5.0 | 5.0 | — | 2.0 | — | — | 1.0 | 0.5 |
| 6 | 13.3 | 14.6 | 53.6 | 5.0 | 5.0 | 5.0 | 2.0 | — | — | 1.0 | 0.5 |
| 7 | 13.3 | 14.6 | 47.6 | 5.0 | 5.0 | 10.0 | 2.0 | 0.5 | 1.0 | 0.5 | 0.5 |
| 8 | 13.3 | 14.6 | 42.6 | 5.0 | 5.0 | 15.0 | 2.0 | 0.5 | 1.0 | 0.5 | 0.5 |
| 9 | 13.3 | 14.6 | 37.6 | 5.0 | 5.0 | 20.0 | 2.0 | 0.5 | 1.0 | 0.5 | 0.5 |
| 10 | 13.3 | 14.6 | 37.6 | 5.0 | 5.0 | 20.0 | 2.0 | — | 2.0 | — | 0.5 |
| 11 | 13.3 | 14.6 | 37.6 | 3.0 | 8.0 | 20.0 | 3.0 | — | — | — | 0.5 |
| 12 | 13.3 | 14.6 | 37.6 | 3.0 | 7.0 | 20.0 | 4.0 | — | — | — | 0.5 |
| 13 | 13.3 | 14.6 | 37.6 | 3.0 | 8.0 | 20.0 | 2.5 | — | — | 0.5 | 0.5 |
| 14 | 13.0 | 14.3 | 36.8 | 2.9 | 7.8 | 19.7 | 5.0 | — | — | — | 0.5 |
| 15 | 12.8 | 14.0 | 36.0 | 2.9 | 7.6 | 19.2 | 7.0 | — | — | — | 0.5 |
| 16 | 13.3 | 14.6 | 37.6 | — | 11.0 | 20.0 | 3.0 | — | — | — | 0.5 |
| 17 | 10.3 | 14.6 | 40.6 | — | 11.0 | 20.5 | 2.5 | — | — | — | 0.5 |
| 18 | 13.3 | 14.6 | 37.6 | — | 14.0 | 17.0 | 3.0 | — | — | — | 0.5 |
| 19 | 13.3 | 14.6 | 37.6 | — | 17.0 | 14.0 | 3.0 | — | — | — | 0.5 |
| 20 | 10.3 | 14.6 | 40.6 | — | 14.0 | 17.0 | 3.0 | — | — | — | 0.5 |
| 21 | 10.3 | 14.6 | 40.6 | — | 17.0 | 14.0 | 3.0 | — | — | — | 0.5 |
| 22 | 15.1 | 2.8 | 42.8 | — | 12.5 | 22.8 | 3.4 | — | — | — | 0.6 |
| 23 | 14.7 | 5.5 | 41.6 | — | 12.2 | 22.1 | 3.3 | — | — | — | 0.6 |
| 24 | 13.9 | 10.6 | 39.4 | — | 11.5 | 21.0 | 3.1 | — | — | — | 0.6 |
| 25 | 14.3 | 8.1 | 40.5 | — | 11.8 | 21.5 | 3.3 | — | — | — | 0.5 |
| 26 | 13.9 | 7.9 | 39.4 | — | 11.5 | 21.0 | 5.8 | — | — | — | 0.5 |
| 27 | 6.8 | 14.6 | 40.6 | — | 20.5 | 14.0 | 3.0 | — | — | — | 0.5 |
| 28 | 9.3 | 13.6 | 39.6 | — | 20.0 | 14.0 | 3.0 | — | — | — | 0.5 |

TABLE 2

| Glass specimen No. | Glass melting temperature (°C.) | Thermal expansion coefficient ($\times 10^{-7}/°C.$) (RT-400° C.) | Glass transition point (°C.) | Dilatometric softening point (°C.) |
|---|---|---|---|---|
| 2 | 1550 | 47.5 | 751 | 795 |
| 3 | 1550 | 57.7 | 704 | 755 |
| 4 | 1550 | 50.9 | 688 | 749 |
| 5 | 1550 | 53.1 | 675 | 733 |
| 6 | 1500 | 54.2 | 656 | 707 |
| 7 | 1400 | 60.0 | 646 | 703 |
| 8 | 1300 | 63.4 | 632 | 672 |
| 9 | 1300 | 67.9 | 617 | 664 |
| 10 | 1300 | 68.7 | 638 | 684 |
| 11 | 1300 | 60.0 | 657 | 715 |
| 12 | 1300 | 59.0 | 651 | 691 |
| 13 | 1300 | 60.3 | 631 | 675 |
| 14 | 1300 | 59.5 | 683 | 699 |
| 15 | 1300 | 60.0 | 635 | 693 |
| 16 | 1300 | 57.9 | 652 | 689 |
| 17 | 1300 | 52.3 | 662 | 698 |
| 18 | 1300 | 59.1 | 654 | 697 |
| 19 | 1300 | 56.9 | 650 | 693 |
| 20 | 1300 | 52.4 | 656 | 696 |
| 21 | 1300 | 50.5 | 655 | 687 |

TABLE 2-continued

| Glass specimen No. | Glass melting temperature (°C.) | Thermal expansion coefficient ($\times 10^{-7}$/°C.) (RT-400° C.) | Glass transition point (°C.) | Dilatometric softening point (°C.) |
|---|---|---|---|---|
| 22 | 1300 | 61.3 | 620 | 668 |
| 23 | 1300 | 58.6 | 619 | 659 |
| 24 | 1300 | 59.3 | 647 | 688 |
| 25 | 1300 | 61.0 | 641 | 690 |
| 26 | 1300 | 59.8 | 624 | 670 |
| 27 | 1300 | 44.5 | 658 | 696 |
| 28 | 1300 | 42.1 | 655 | 695 |

TABLE 3

TABLE 3-continued

| Glass Specimen No. | Crystallization upon sintering at 850–900° C. | Crystal phase | Thermal expansion coefficient after crystallization ($\times 10^{-7}$/°C.) (RT-400° C.) |
|---|---|---|---|
| 23 | ○ | CAS | 58.0 |
| 24 | ○ | CAS | 52.2 |
| 25 | ○ | CAS | — |
| 26 | ○ | CAS | — |
| 27 | ○ | CAS,ZA | 40.5 |
| 28 | ○ | CAS,ZA | 36.8 |

Note:
CAS: $CaO.Al_2O_3.2SiO_2$, NAS: $NaAlSi_3O_8$, ZA: $ZnO.Al_2O_3$

TABLE 4

| Experiment No. | | Glass specimen No. | Alumina powder (W %) | Sintering Temp. (°C.) | Crystal phase (V %) | | | | Bending strength (kg/cm²) | Thermal expansion coefficient ($\times 10^{-7}$/°C.) (RT-400° C.) | Dielectric constant (1MHz) |
|---|---|---|---|---|---|---|---|---|---|---|---|
| | | | | | Alumina | Anorthite | Gahnite | Amorphous glass | | | |
| 1 | Comp. Example | 16 | 0 | 900 | 0 | 28.5 | 0 | 71.5 | 1330 | 50.1 | 6.4 |
| 2 | Example | 16 | 40 | 900 | 21.5 | 46.0 | 2.1 | 30.4 | 2550 | 51.5 | — |
| 3 | Comp. Example | 19 | 0 | 900 | 0 | 26.0 | 0 | 74.0 | 1050 | 47.3 | 7.8 |
| 4 | Example | 19 | 40 | 900 | 18.4 | 45.3 | 8.3 | 28.0 | 3010 | 55.3 | — |
| 5 | Comp. Example | 24 | 0 | 900 | 0 | 21.2 | 0 | 78.8 | 930 | 52.2 | — |
| 6 | Comp. Example | 24 | 20 | 900 | 6.2 | 44.0 | 3.6 | 46.2 | 510 | 46.7 | — |
| 7 | Example | 24 | 40 | 900 | 16.1 | 46.9 | 6.0 | 31.0 | 2710 | 48.7 | — |
| 8 | Example | 24 | 42 | 850 | 18.2 | 41.1 | 4.5 | 36.2 | 2900 | 51.4 | — |
| 9 | Example | 24 | 42 | 875 | 17.1 | 44.0 | 5.1 | 33.8 | 3005 | 49.9 | — |
| 10 | Example | 24 | 42 | 900 | 17.0 | 46.0 | 6.2 | 29.6 | 3040 | 49.2 | 8.6 |
| 11 | Example | 24 | 44 | 900 | 20.1 | 46.0 | 6.0 | 27.9 | 2770 | 49.7 | — |
| 12 | Comp. Example | 24 | 50 | 900 | 24.3 | 42.8 | 4.1 | 28.8 | 1980 | 51.0 | — |
| 13 | Comp. Example | 24 | 60 | 900 | 27.0 | 40.6 | 2.9 | 29.5 | 1300 | 53.6 | — |
| 14 | Example | 21 | 40 | 875 | 23.6 | 34.0 | 8.1 | 34.3 | 3225 | 52.8 | — |
| 15 | Example | 21 | 40 | 900 | 20.2 | 35.5 | 9.3 | 35.0 | 3510 | 53.4 | — |
| 16 | Example | 20 | 40 | 900 | 19.0 | 36.2 | 8.6 | 36.2 | 3310 | 53.9 | — |
| 17 | Comp. Example | 22 | 40 | 900 | 17.1 | 32.2 | 0.8 | 49.9 | 1340 | — | — |
| 18 | Comp. Example | 23 | 40 | 900 | 18.2 | 34.1 | 0.9 | 47.8 | 1700 | — | — |
| 19 | Example | 27 | 38 | 900 | 15.5 | 23.0 | 19.8 | 41.7 | 3160 | 57.4 | — |
| 20 | Example | 28 | 38 | 900 | 15.3 | 30.6 | 14.9 | 39.2 | 3220 | 55.7 | — |

| Glass Specimen No. | Crystallization upon sintering at 850–900° C. | Crystal phase | Thermal expansion coefficient after crystallization ($\times 10^{-7}$/°C.) (RT-400° C.) |
|---|---|---|---|
| 1 | x | — | — |
| 2 | x | — | — |
| 3 | x | — | — |
| 4 | x | — | — |
| 5 | x | — | — |
| 6 | x | — | — |
| 7 | ○ | CAS,NAS | — |
| 8 | ○ | CAS,NAS | — |
| 9 | ○ | CAS,NAS | 70.1 |
| 10 | ○ | CAS,NAS | — |
| 11 | ○ | CAS | 51.8 |
| 12 | ○ | CAS | — |
| 13 | ○ | CAS | 57.8 |
| 14 | ○ | CAS | — |
| 15 | ○ | CAS | — |
| 16 | ○ | CAS | 50.1 |
| 17 | ○ | CAS | 43.2 |
| 18 | ○ | CAS | 50.2 |
| 19 | ○ | CAS | 47.3 |
| 20 | ○ | CAS | 43.7 |
| 21 | ○ | CAS | 46.1 |
| 22 | ○ | $2CaOZnO2SiO_2$ $ZnOAl_2O_32SiO_2$ | 100.1 |

When the present invention is practiced, since the substrate can be sintered at a temperature lower than 900° C., the mechanical strength is more than 2500 kgf/cm² and the thermal expansion coefficient is less than $60 \times 10^{-7}$/°C., an improved ceramic substrate sintered as low temperature using Au, Ag and Cu as a conductor can be used, and it is comparable with an alumina substrate in use, to attain a great advantageous effect.

What is claimed is:

1. A ceramic substrate which is sintered at a temperature below 900° C. and which comprises:
   50 to 65% by weight of a mixture composed of 20 to 50% by volume of an anorthite crystal phase, 1 to 20% by volume of a gahnite crystal phase, and a balance of a glass phase; and
   35 to 50% by weight of alumina as a filler.

2. A ceramic substrate as defined in claim 1, wherein the anorthite crystal phase is from 35 to 50% by volume.

3. A ceramic substrate as defined in claim 1, wherein the gahnite crystal phase is from 3 to 15% by volume.

4. A ceramic substrate as defined in claim 1, wherein respective starting oxides, for obtaining the anorthite, gahnite and the glass phase containing a flux comprise 5–20% by weight of CaO, 10–20% by weight of $Al_2O_3$, 30–45% by weight of $SiO_2$, 0–10% by weight of MgO, 2.5–20% by weight of ZnO, 10–24% by weight of PbO, 0–5% by weight of $B_2O_3$, 0–2% by weight of $Li_2O$ and 0.1–1% by weight of $Sb_2O_3$.

5. A ceramic substrate as defined in claim 1, wherein the grain size of alumina as the filler is from 0.5 to 0.8 μm.

6. A ceramic substrate sintered at temperature below 900° C. obtained by a method which comprises the steps of:

mixing starting oxides comprising 5–20% by weight of CaO, 10–20% by weight of $Al_2O_3$, 30–45% by weight of $SiO_2$, 0–10% by weight of MgO, 2.5–20% by weight of ZnO, 10–24% by weight of PbO, 0–5% by weight of $B_2O_3$, 0–2% by weight of $Li_2O$ and 0.1–1% by weight of $Sb_2O_3$, melting the mixture at 1300° to 1600° C.

then gradually cooling the same to form solid glass, finely pulverizing the solid glass to form a glass frit;

mixing the resultant glass frit with 35 to 50% by weight of alumina as a filler and with an organic binder, molding the mixture into a layer, laminating several said layers under pressure into a green sheet, and then sintering the sheet at a temperature lower than 900° C.

7. A ceramic substrate as defined in claim 6, wherein the sintering step is conducted at 800° to 900° C.

8. A ceramic substrate as defined in claim 6, including a step of adding one material selected from the group consisting of zircon, cordierite and mullite to the glass frit.

* * * * *